(12) United States Patent
Ng et al.

(10) Patent No.: US 8,742,690 B2
(45) Date of Patent: Jun. 3, 2014

(54) METHOD, OPERATING DEVICE, AND LIGHTING SYSTEM

(75) Inventors: Chong Ng, Tyne and Wear (GB); Paul Dalby, Cleveland (GB); Jamie Kelly, Tyne and Wear (GB)

(73) Assignee: Tridonic GmbH and Co KG, Dornbirn (AT)

( * ) Notice: Subject to any disclaimer, the term of this patent is extended or adjusted under 35 U.S.C. 154(b) by 329 days.

(21) Appl. No.: 13/143,907

(22) PCT Filed: Jan. 7, 2010

(86) PCT No.: PCT/EP2010/050094
§ 371 (c)(1),
(2), (4) Date: Aug. 12, 2011

(87) PCT Pub. No.: WO2010/079190
PCT Pub. Date: Jul. 15, 2010

(65) Prior Publication Data
US 2011/0304272 A1    Dec. 15, 2011

(30) Foreign Application Priority Data

Jan. 9, 2009   (DE) .......................... 10 2009 004 174
Feb. 20, 2009  (DE) .......................... 10 2009 009 915

(51) Int. Cl.
*H05B 37/02*     (2006.01)
(52) U.S. Cl.
USPC ....................... 315/302; 315/209 R; 315/308

(58) Field of Classification Search
USPC .......... 315/200 R, 209 R, 246–247, 291, 302, 315/307–308
See application file for complete search history.

(56) References Cited

U.S. PATENT DOCUMENTS

| 5,907,223 | A  | 5/1999  | Gu et al. |
| 6,181,079 | B1 | 1/2001  | Chang et al. |
| 6,556,457 | B1 | 4/2003  | Shimazaki et al. |
| 2003/0206426 | A1 | 11/2003 | Lin et al. |
| 2005/0218838 | A1 | 10/2005 | Lys |

(Continued)

FOREIGN PATENT DOCUMENTS

| EP | 1473976 A1 | 11/2004 |
| EP | 1776000 A2 | 4/2007 |

OTHER PUBLICATIONS

Patent Search Report PCT/EP2010/050094, dated Aug. 11, 2011, 8 pages.

(Continued)

*Primary Examiner* — Jason M Crawford
(74) *Attorney, Agent, or Firm* — Lee & Hayes, PLLC

(57) ABSTRACT

The application relates to a circuit for operating a light-emitting means, having a half-bridge or full-bridge circuit for providing a supply voltage for the at least one light-emitting means, and a control circuit for the closed-loop control of the operation of the light-emitting means and/or fault identification. A measurement signal which represents the current through the bridge circuit and/or a measurement signal which represents the lamp current and a measurement signal which represents the voltage across the at least one light-emitting means are supplied to the control circuit at the same input.

21 Claims, 15 Drawing Sheets

(56) References Cited

U.S. PATENT DOCUMENTS

| | | |
|---|---|---|
| 2006/0002159 A1 | 1/2006 | Lin et al. |
| 2006/0006811 A1 | 1/2006 | Green et al. |
| 2006/0066258 A1 | 3/2006 | Lane et al. |
| 2006/0132997 A1 | 6/2006 | Chu et al. |
| 2006/0284568 A1 | 12/2006 | Chang et al. |
| 2008/0018261 A1* | 1/2008 | Kastner .................. 315/192 |
| 2010/0060200 A1* | 3/2010 | Newman et al. .......... 315/307 |

OTHER PUBLICATIONS

Chen et al., "High Speed Digital Isolators Using Microscale On-Chip Transformers," English translation of Abstract, retrieved at <<http://www.datasheetarchive.com/datasheet-pdf/03/DSA0038500.html>>, Elektronik magazine, Jul. 22, 2003, pp. 1-2.

Patent Search Report PCT/EP2009/007907, dated Nov. 4, 2009, 5 pages.

Patent Search Report PCT/EP2010/050094, dated Mar. 24, 2010, 3 pages.

* cited by examiner

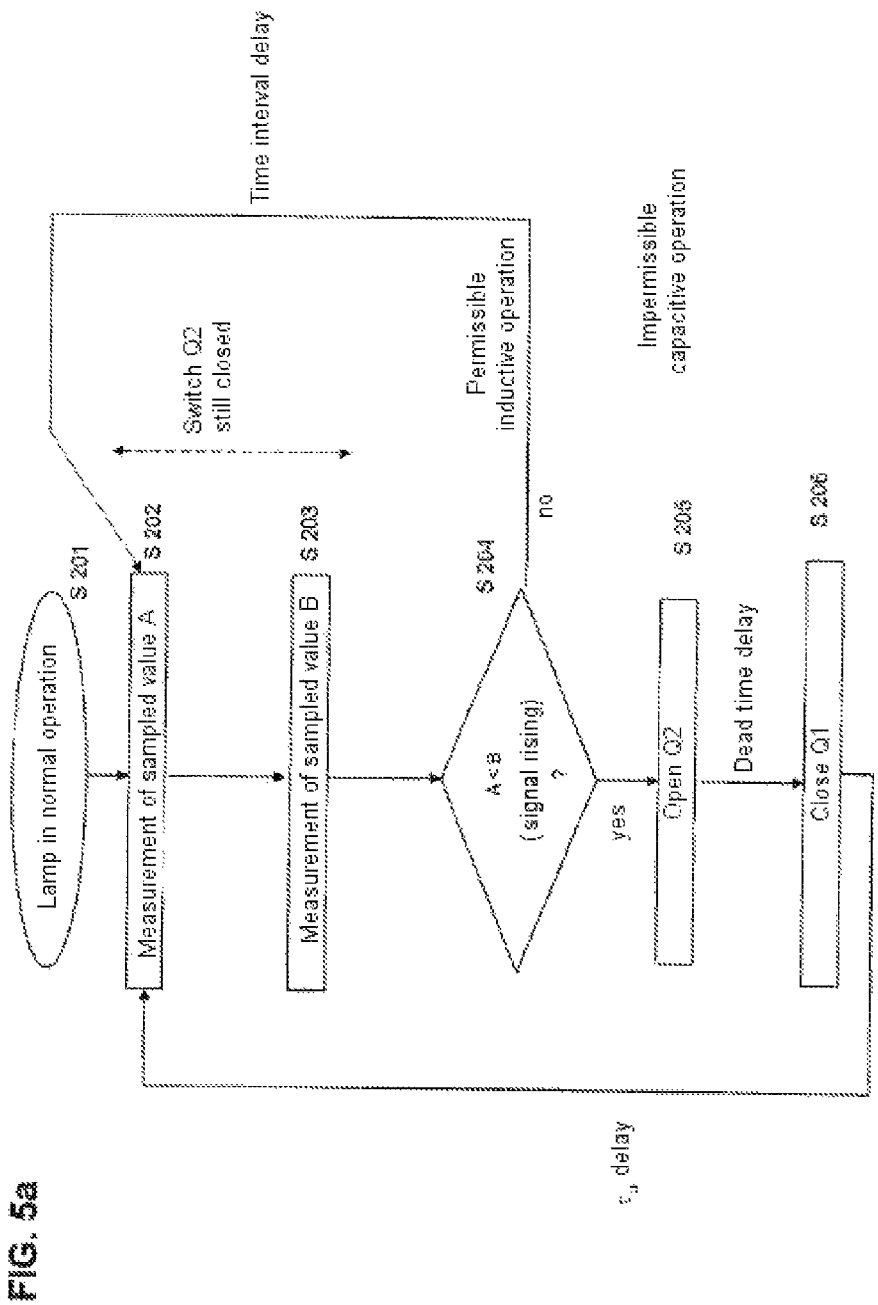

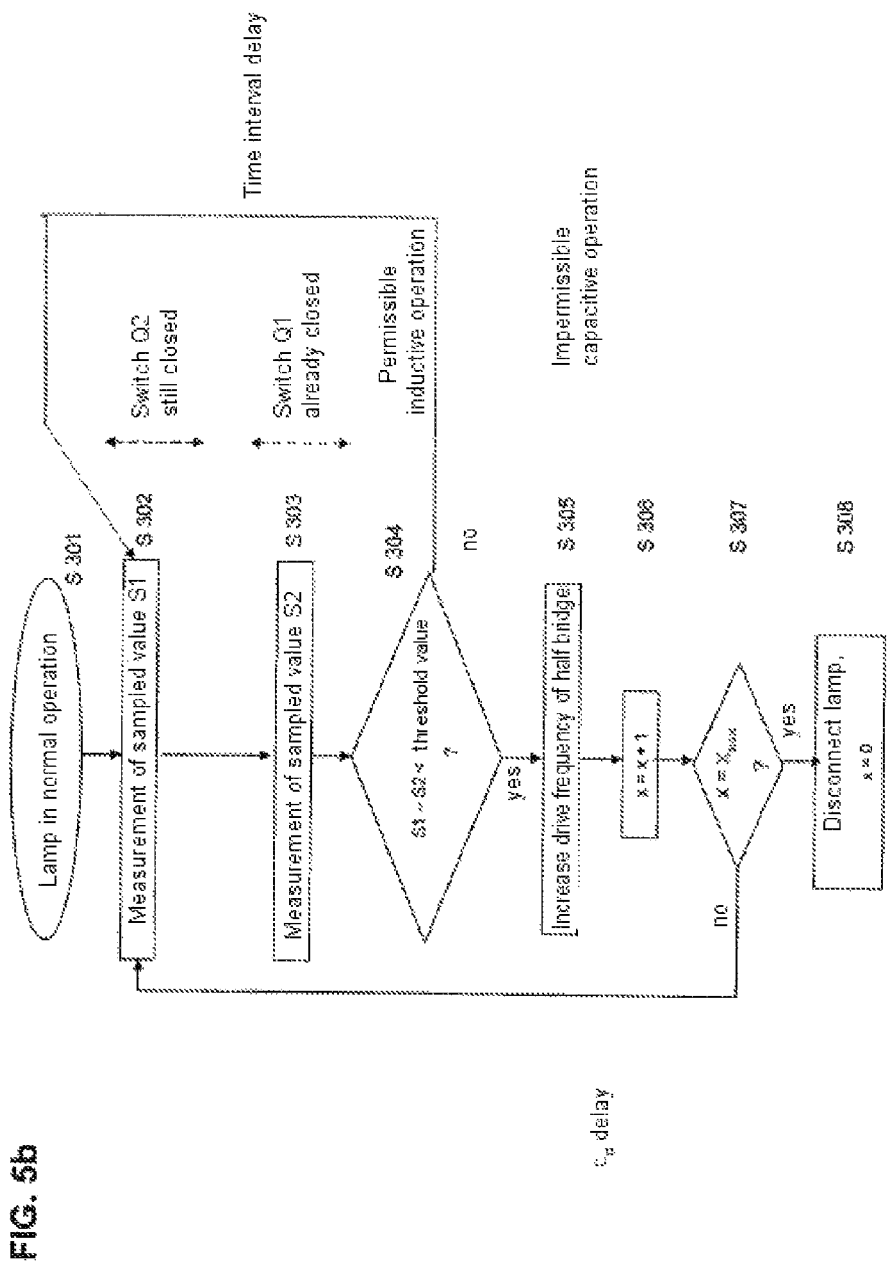

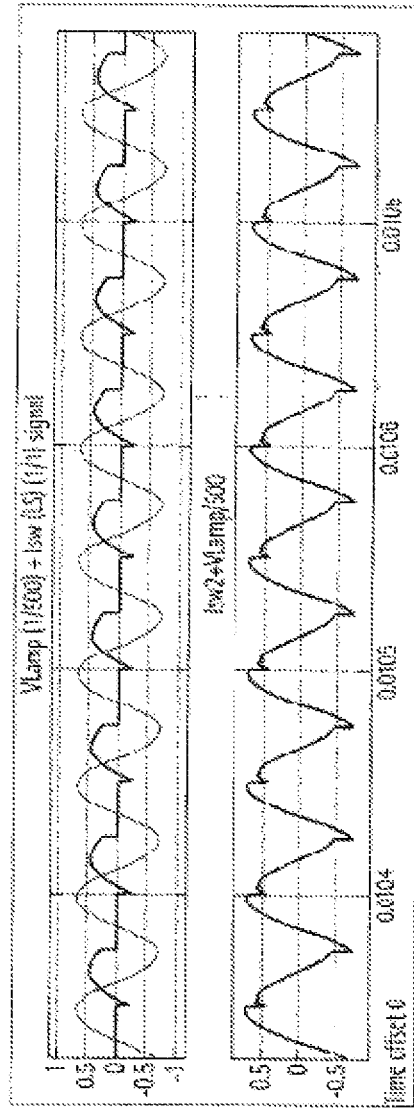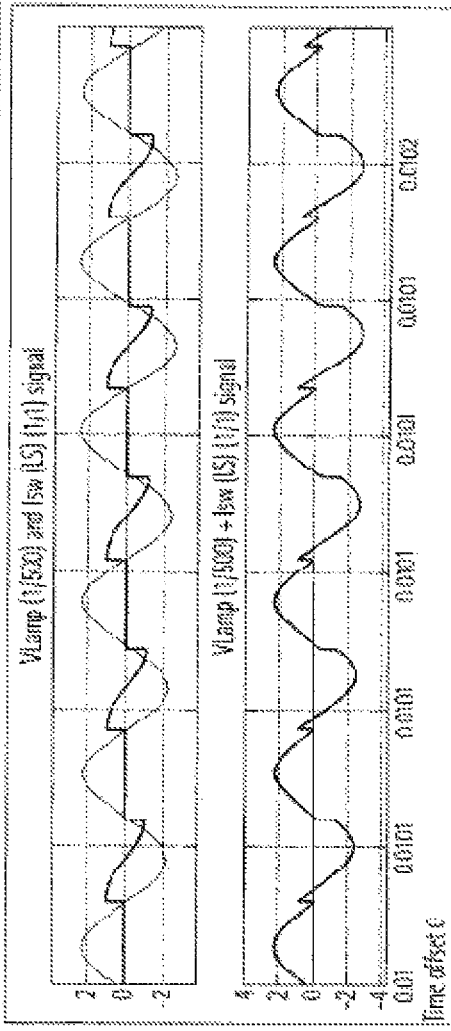

METHOD, OPERATING DEVICE, AND LIGHTING SYSTEM

This Application is a National Stage of International Application No. PCT/EP2010/050094, filed Jan. 7, 2010, which claims foreign priority to German Application No. 10 2009 004 174.5, filed Jan. 9, 2009, and German Application No. 10 2009 009 915.8, filed Feb. 20, 2009, all of which are incorporated herein by reference.

The present invention relates to operating devices for light-emitting means, in particular for gas discharge lamps, LEDs or OLEDs, and to a lighting system.

The object of the invention is to implement closed-loop control or fault identification during operation of light-emitting means in an efficient manner.

This object is achieved according to the invention by the features of the independent claims. The dependent claims develop the central concept of the invention in a particularly advantageous manner.

A first aspect of the invention relates to a method for operating at least one light-emitting means. In this case, the light-emitting means is operated starting from a half-bridge or full-bridge circuit. A measurement signal which represents the current through the bridge circuit and/or a measurement signal which represents the lamp current is/are supplied to an input of a control circuit. A measurement signal which represents the voltage across the at least one light-emitting means is supplied to the same input of the control circuit. If the control circuit is in the form of an integrated circuit, it is therefore possible to dispense with one or two pin(s) of the IC since two or three supplied measurement signals are evaluated at one pin.

The control circuit can evaluate the supplied measurement signals for fault identification and/or for operation of the light-emitting means, in particular for adjusting a parameter representing the power of the light-emitting means.

In the event of fault identification, the control circuit can output a fault signal, change the mode of operation of the light-emitting means or disconnect the light-emitting means.

An overvoltage fault state can be detected when the lamp voltage is above a predetermined threshold value. In this case, for example, the control circuit can open the lower-potential switch of a half bridge prematurely and/or increase the frequency of the alternate clocking of the two switches of the half bridge.

An overcurrent fault state can be identified using a half-bridge current or lamp current which is above a predetermined threshold value.

A "capacitive operation" fault state can be identified using a half-bridge current which rises at the time at which the lower-potential switch of the half bridge is switched off (gradient measurement) or which is in an impermissible range, i.e. above a predetermined threshold, for example (absolute value measurement). In the event of this fault state, for example, the drive frequency of the alternate clocking of the switches of the half bridge can be increased until capacitive operation is no longer identified.

An "EOL" (End of Life, rectifier effect of the lamp) fault state can be identified on the basis of the fact that the addition of two measured values for the lamp voltage which are taken at two successive zero crossings of the half-bridge current produces a value in an impermissible range.

A further aspect of the invention relates to a control circuit, in particular an ASIC, which is designed for a method as claimed in one of the preceding claims.

Yet another aspect of the invention relates to a circuit for operating a light-emitting means. The circuit has:

a half-bridge or full-bridge circuit for providing a supply voltage for the at least one light-emitting means (for example the light-emitting means can be part of a load circuit with a resonant circuit), and a control circuit for the closed-loop control of the operation of the light-emitting means and/or fault identification, wherein a measurement signal which represents the current through the bridge circuit and/or a measurement signal which represents the lamp current and a measurement signal which represents the voltage across the at least one light-emitting means are supplied to the control circuit at the same input.

The half-bridge or full-bridge circuit with the load circuit connected can also have a transformer for potential isolation. If a resonant circuit is provided, said transformer can use series and/or parallel resonance.

In this case, the control circuit can be designed to evaluate the supplied measurement signals for fault identification and/or for operation of the light-emitting means, in particular for adjusting a parameter representing the power of the light-emitting means.

The lamp voltage can be detected via a resistive divider.

The half-bridge current can be detected via a measuring resistor in series with the lower-potential switch of the half bridge.

The invention also relates to a lighting system, having a control unit and at least one operating device of the above-mentioned type which is preferably connected thereto via a bus line.

Further advantages, properties and features of the invention will now be explained with reference to the figures in the attached drawings, in which:

FIG. 5a shows a flowchart for explaining a first method according to the invention for identifying and correcting capacitive operation.

FIG. 5b shows a flowchart for explaining a second method according to the invention for identifying and correcting capacitive operation.

FIG. 8 shows a graph showing the identification of inductive operation by means of gradient measurement.

FIG. 9 shows a graph showing the identification of capacitive operation by means of gradient measurement.

Figure 1:
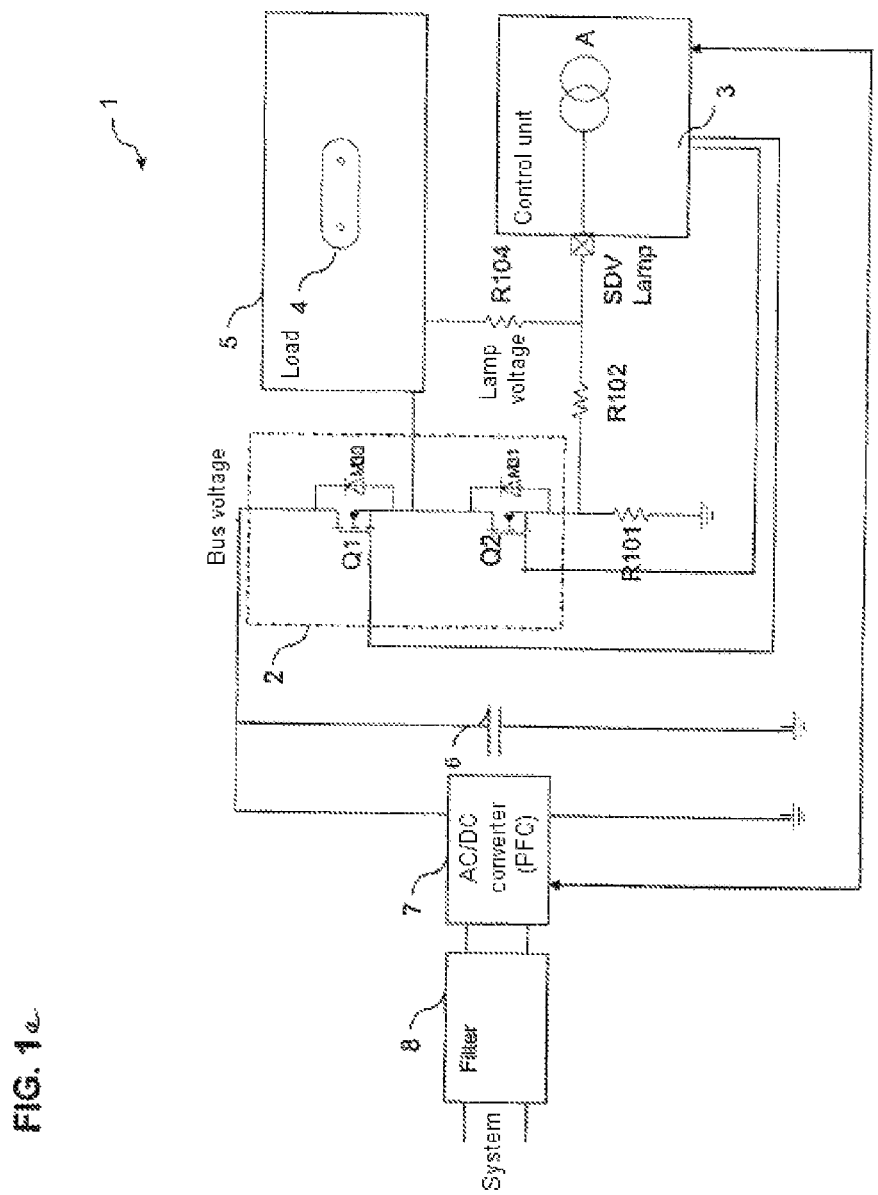
FIGS. 1a, 1b show a schematic illustration of a first exemplary embodiment of the invention and a development thereof, respectively.

First, a first exemplary embodiment of a measurement circuit for an operating device 1 for at least one light-emitting means will be explained using the schematic in FIG. 1a.

The AC system voltage is supplied to an AC/DC converter 7 via a filter 8. In the AC/DC converter 7, the AC system voltage is converted into a DC voltage and is adjusted to a higher voltage, preferably between 300 V and 400 V. This voltage is correspondingly also present at the storage capacitor 6. The AC/DC converter 7 can contain a rectifier and also an active power factor correction (PFC) circuit (clocked by a switch controlled by a control unit or formed by a charge pump circuit (active or passive valley fill)).

An inverter 2, in this case a half bridge, drives the switches Q1 and Q2, preferably power transistors, alternately. Said inverter is used for providing a supply voltage for at least one light-emitting element 4. The light-emitting element or light-emitting means may be a gas discharge lamp, or else any other type of light-emitting means, for example an LED or OLED or LED/OLED array.

For reasons of simplicity, the load 5, containing the light-emitting element 4 and further electrical components required for the series circuit are only indicated in FIG. 1a. However, reference can be made to FIG. 3 for this.

The half-bridge current is detected via a measuring resistor R102 in series with the lower-potential switch Q2 of the half bridge. The lamp voltage is detected via a resistive divider R104. The two measured signals are preferably supplied to a control circuit 3, preferably an ASIC, via an individual pin SDV_lamp. As an alternative to the ASIC, however, any other form of integrated circuit such as a microcontroller or a hybrid solution, or a conventional (discrete) circuit can also be used.

The ASIC 3 likewise controls the DC/DC converter and the clock frequency of the half bridge 2.

Therefore, an addition of the voltages of the resistive lamp voltage divider R104 and the measuring resistor R102 is applied to the pin SDV_lamp. However, it is also possible to connect the two signals to different terminals of the ASIC. The ASIC 3 has an internal constant current source A. Said constant current source applies a DC level to the incoming signal, with the result that negative voltages at the pin SDV-lamp are avoided.

The signal of the half-bridge current has a regular time interval, preferably with half a period length, in which it is zero. The reason for this is that, during this time, the switch Q2 is open and therefore no half-bridge current is measured. During this time period, only the lamp voltage is therefore present at the pin SDVlamp. This circumstance can be utilized for discriminating the two signals.

The signal of the lamp voltage has a sinusoidal curve, which can be determined to a sufficient extent by measuring frequency and amplitude. Examples of both signals are shown in FIG. 7 to FIG. 13.

Furthermore, the fact that lamp voltage fault states are comparatively slow phenomena, while the fault states with the half-bridge current occur with a comparatively large amplitude but for a short period of time can be utilized for the discrimination.

With the aid of the two signals, an overcurrent, for example in the case of inductor saturation during the lamp starting operation or an overcurrent during lamp operation can be determined, as is described in more detail below. Furthermore, capacitive operation of the lamp and an EOL (End of Lamp Life) effect of the lamp can be identified.

Figure 1B:
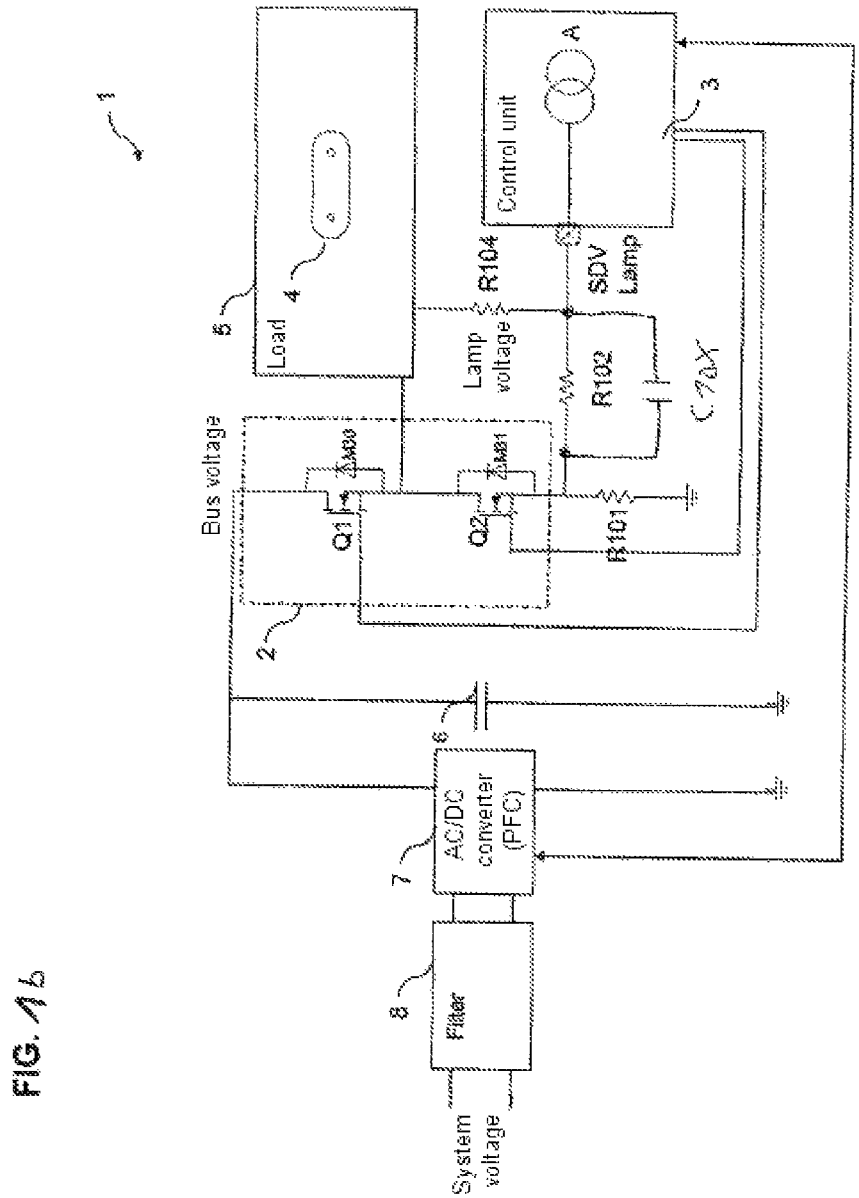

The measurement circuit in FIG. 1b represents an improvement over the exemplary embodiment in FIG. 1a (the change corresponds to the change for FIG. 2 explained below except that fewer components are required for the variant in FIG. 1b). The same component parts as in FIG. 1a are denoted by the same reference symbols.

The damping of the AC voltage component of the lamp voltage is performed independently of its DC voltage component in the circuit shown in FIG. 1b. Preferably, the AC voltage component is damped to a greater extent than the DC voltage component. This is achieved by the parallel circuit comprising the capacitor C10X and the resistor R102. This parallel circuit has, as a low-pass filter, a strong damping effect on relatively high frequencies. The capacitor C10X acts as the filter for the AC component. The AC component is therefore damped to a lesser extent than the AC component.

This results in the advantage that both values can be damped in the ranges suitable for the ASIC. This is necessary since the voltage peaks of the AC voltage component are a multiple higher in the starting operation than the DC voltage component, whose DC offset is used for identifying an EOL. If the capacitor C10X has a sufficiently large value, the radiofrequency AC voltage component of the lamp voltage can be filtered out, with the result that the detected signal at the input SDVLamp comprises the DC voltage component of the lamp voltage and the half-bridge current. Therefore, the DC voltage component of the lamp voltage can be measured during the phase in which there is no half-bridge current detected, while the half-bridge current can be detected in the phase in which there is a half-bridge current flowing, taking into consideration the determined DC voltage component of the lamp voltage.

Figure 2:
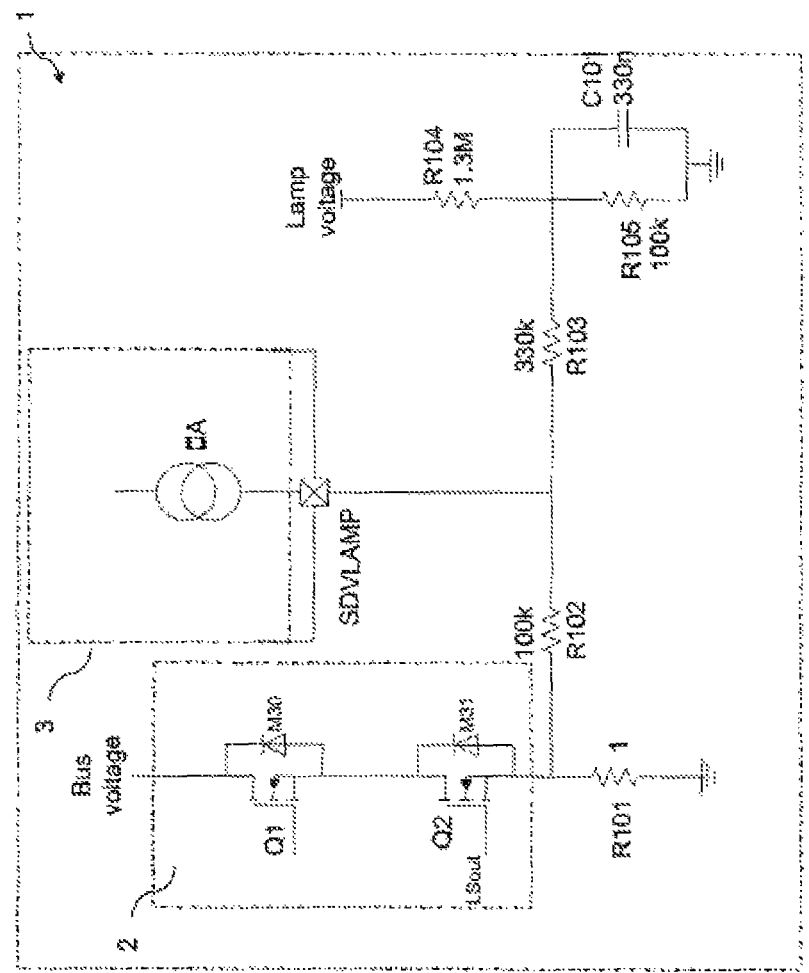
FIG. 2 shows a schematic illustration of a second exemplary embodiment of the invention.

The measurement circuit in FIG. 2 represents an improvement over the exemplary embodiment in FIG. 1. The damping of the AC voltage component of the lamp voltage in this case takes place independently of its DC voltage component. Preferably, the AC voltage component is damped to a greater extent than the DC voltage component. This is achieved by the parallel circuit comprising the capacitor C101 and the resistor R105. This parallel circuit has, as low-pass filter, a strongly damping effect on relatively high frequencies. The capacitor C101 acts as a filter for the AC component. Therefore, the DC component is damped to a lesser extent than the AC component.

This results in the advantage that both values can be damped in ranges suitable for the ASIC. This is necessary since the voltage peaks of the AC voltage component are a multiple higher in the starting operation than the DC voltage component, whose DC offset is used for identifying an EOL. For further details relating to EOL, reference can be made to FIG. 6.

Furthermore, it is now only necessary to process the AC signal of the half-bridge current. This AC signal can be used, for example, for identifying saturation of the inductor and for identifying an overcurrent, capacitive operation or else for closed-loop preheating control.

During starting identification, monitoring is also performed to ascertain whether the inductor is no longer entering saturation. When starting a lamp which is unable to start or is defective, the circuit is driven to saturation since the frequency is shifted very close to resonance. This lack of saturation, or of a high starting current, can be used as starting identification signal.

Further advantageous evaluation possibilities for the current signal are disclosed below. For this purpose, the half-bridge current and/or the lamp current can be detected. In order that the lamp current can be used for measuring during preheating, there is a need for a special series circuit, such that this lamp current can also be measured during preheating. The lamp current signal can be measured at the point "lamp voltage" (FIG. 2). The half-bridge current can be detected via the measured voltage at the half-bridge shunt R101:

Half-bridge current measurement and/or lamp current measurement can be used for the closed-loop control of the lamp power or the preheating energy.

In addition, a measurement for identifying the lamp filaments using the transmitted preheating energy or the filament wire can be carried out. Therefore, lamp identification can be performed.

"Relamp" identification can be performed, i.e. to ascertain whether a (new) lamp has been inserted, namely on the basis of the response of the output circuit.

Half-bridge current measurement and/or lamp current measurement can be used for fault identification: the risk of saturation during starting or of an excessively high current also during operation can be reduced.

In addition, protection against capacitive lamp operation and/or overload of the switches during switching on can be achieved.

Half-bridge current measurement and/or lamp current measurement can be used for closed-loop current control.

The half-bridge current can also be used for the closed-loop control of the heating energy, in particular the preheating energy.

The lamp current can be used for the closed-loop control of the lamp power of for the closed-loop control of the preheating energy.

Saturation (in particular during starting) or an overvoltage in the load circuit can also be identified using the voltage measurement.

Further advantageous applications of the voltage evaluation are given below:

Voltage measurement can be used for end-of-life identification of the lamp.

Lamp voltage measurement can be performed.

Identification of the heating wire can be performed, for example by means of the DC path of the bus voltage. As a result, it is likewise possible to identify whether a lamp has been inserted at all.

"Relamp" identification can be performed, i.e. to ascertain whether a new lamp has been inserted.

Lamp starting can be identified.

It should be noted here that any evaluation possibilities for the current measurement can be combined with those for the voltage measurement.

Figure 3:
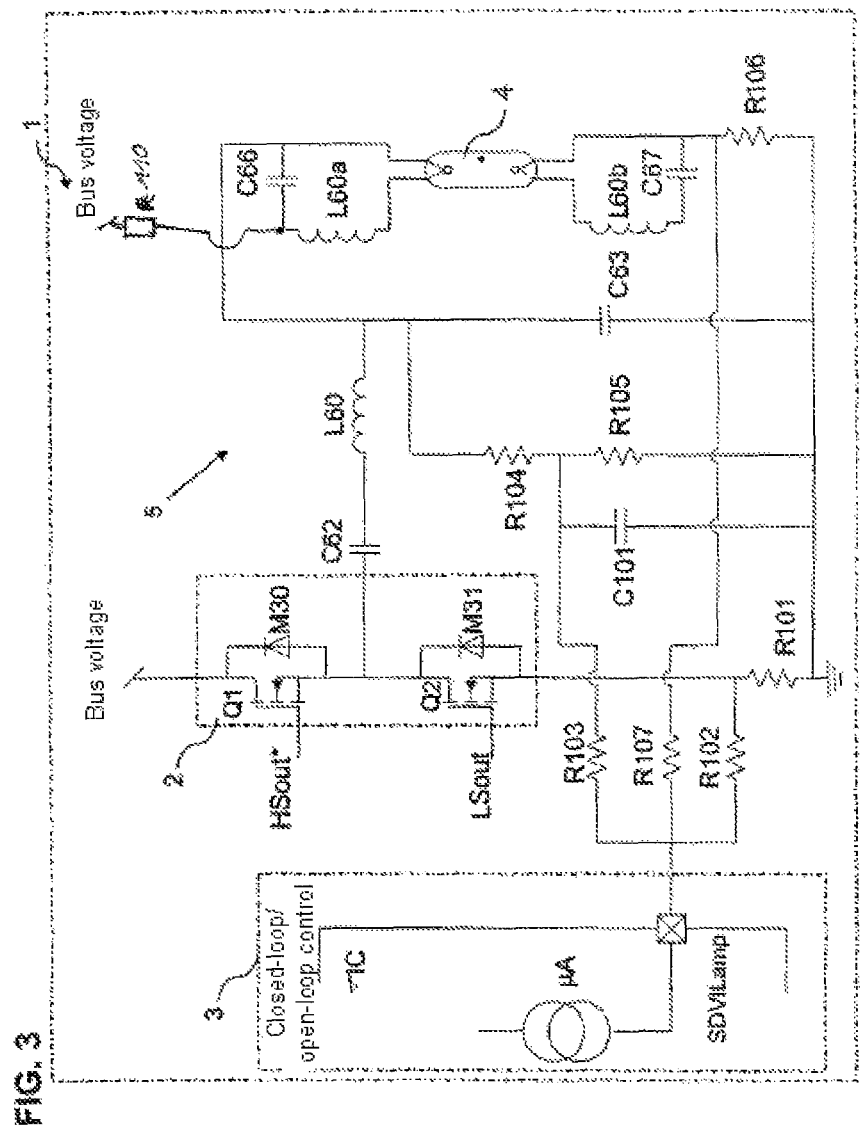
FIG. 3 shows a schematic illustration of a third exemplary embodiment of the invention.

The measurement circuit in FIG. 3 represents a further improvement over the exemplary embodiment in FIG. 2.

As shown above for FIG. 2, the AC voltage component of the lamp voltage is also suppressed here. It is therefore possible to superimpose a further AC component on the signal at the pin SDVILamp.

In this case, the lamp current is also measured in addition to the signal of the half-bridge current and the lamp voltage. All three signals are preferably supplied to the same pin SDVILamp of the ASIC 3. However, it is also possible to connect the three signals to different terminals or only to connect some of the three signals (i.e. two signals, for example).

As has already been shown in FIG. 2, the half-bridge current is detected via a measuring resistor R102 in series with the lower-potential switch Q2 of the half bridge. The lamp voltage is detected via a resistive divider R104. The lamp current is measured at a measuring resistor R107.

Furthermore, FIG. 3 shows the further electrical components of the operating device 1 together with the light-emitting means (referred to as the lamp below). The operating device 1 has an inverter 2, in this case a half bridge. This inverter provides a supply voltage for at least one light-emitting element. This supply voltage is supplied to a coupling capacitor C62. The coupling capacitor C62 is connected to a series resonant circuit L60-C63. This series resonant circuit is used for starting the light-emitting means 4. The light-emitting means 4 also has heating filaments L60a and L60b.

The upper heating filament is connected to the bus voltage via the resistor R110, as a result of which a DC path is formed via the lamp filament and the resistors R104 and R103. It is therefore possible for identification of the heating wire to be performed, i.e. for an electrical parameter of the heating wire to be evaluated, in order to be able to derive operational parameters to be set therefrom (for example by means of a stored look-up table). When the lamp filament in this DC path is broken or there is no lamp inserted, this DC path is interrupted (since the capacitor C66 does not allow any DC current to pass through). As a result, it is likewise possible to identify whether a lamp has been inserted at all or whether a lamp has recently been inserted or replaced. Instead of the bus voltage, it is also possible to use another feed voltage such as the rectified system voltage, for example. The measurement for identification of the heating wire (i.e. for identifying whether a lamp with an unbroken lamp filament has been inserted; also referred to as "relamp" identification) can preferably be performed prior to or during the preheating or else repeatedly following a disconnection owing to a lamp fault.

During starting, the impermissible state of the inductor L60 being saturated can occur. The current rise is therefore no longer damped. Instead, it rises to an impermissible extent to a peak.

In order to start a lamp, first the heating filaments of the lamp 4 are preheated. For this purpose, the half bridge 2 generates an AC voltage which is above the resonant frequency of the resonant circuit L60-C63. The resultant voltage is too low for causing the lamp 4 to start. The pin SDVILamp may be in a standby state at this time if none of the above-described measurements are utilized, such as the lamp filament identification or the preheating closed-loop control, for example.

At the end of the preheating time, the lamp 4 is started by virtue of the fact that the switch-on time of the two switches Q1 and Q2 of the inverter is increased stepwise. Correspondingly, the operating frequency of the inverter is reduced.

In the preheating phase, a low current flows through the lamp. The DC offset which is caused by the EOL effect is very low. It can therefore be ignored in this case. Compensation of a DC offset by an internal DC current source A is therefore not required here. It is thus possible to only switch on the internal current source A once the lamp has been started with a preset value.

The internal current source A can also be realized as a current source which can be switched stepwise or as a parallel circuit comprising two current sources. As a result, different currents can be impressed by the internal current source A for compensating for a DC offset and thus different levels of compensation or different disconnection sensitivities can be achieved during the different operating phases. Preferably, during starting, a lower current can be set for the internal current source A, with the result that a lower sensitivity can be set corresponding to the high voltages to be expected.

The identification of faults such as the identification of the EOL effect, for example, can be activated depending on the operating state of the lamp or the circuit.

Figure 4:
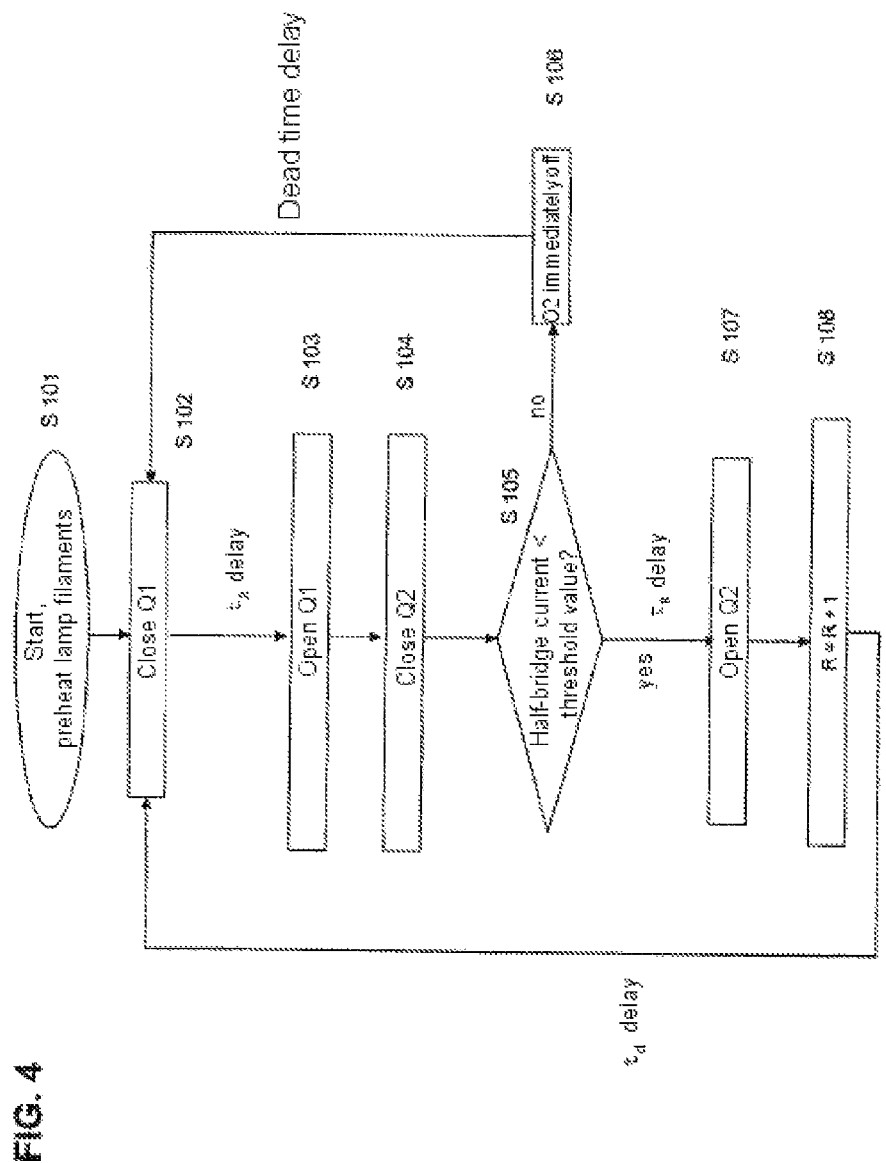
FIG. 4 shows a flowchart for explaining a method according to the invention for identifying and correcting an impermissibly high half-bridge current in the lamp starting operation.

The flowchart in FIG. 4 describes a method for avoiding overcurrent during lamp starting.

After the start of the operation in step S101, the heating filaments are preheated. In S102, switch Q1 of the inverter is closed. Switch Q2 is open at this point. After a time $t_R$, the switch Q1 is opened again in S103. $t_R$ is preferably half the period of the present operating frequency of the inverter, but it may also be a shorter period of time.

In S104, the switch Q2 is closed. A delay time $t_D$ can be provided between S103 and S104.

In S105, the signal applied to pin SDVlamp is measured. If this signal is above a threshold value Vlamp peak (pk), an impermissibly high current is supplied to the lamp. However, it is also conceivable for an impermissibly high current only to be established when the threshold value has been exceeded a plurality of times, for example five times.

In addition, the rise in current can also be evaluated and an impermissibly high rise can be used as an additional evaluation criterion.

When determining the threshold value, the alternating signal of the AC lamp voltage needs to be taken into consideration continuously using the characteristic to be analyzed in the ASIC. For this purpose, the signal of the lamp voltage needs to be compensated for by the ASIC in analogous fashion without a delay. With the aid of the time window in which switch Q2 is open and correspondingly the measured half-bridge current is zero, the maximum and minimum of the lamp voltage sinusoidal signal can be determined.

During smoothing or damping of the AC voltage component of the lamp voltage by a capacitor (see FIG. 2 and FIG. 1b), however, it may be sufficient for it only to be necessary for the DC voltage component of the lamp voltage to be taken into consideration.

Figure 7:
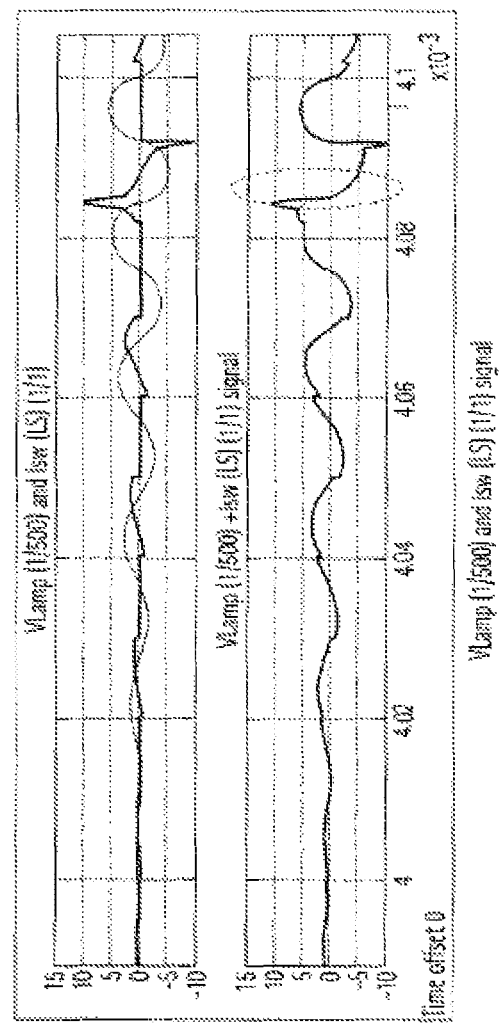
FIG. 7 shows a graph showing the identification of an excessively high half-bridge current during lamp starting operation.

An illustration of the signal to be analyzed is given in FIG. 7.

In order to feed back the half-bridge current in permissible ranges, the switch Q2 is opened immediately again in S106. This is equivalent to an increase in the present switching frequency. The actual operating frequency of the inverter is unchanged, however. Instead, the operation is repeated whilst maintaining the present operating frequency, preferably after a dead time, by a return to S102. However, it is also possible to achieve feedback of the half-bridge current in permissible ranges by virtue of the operating frequency of the inverter being increased for a short period of time.

If the signal present at pin SDVlamp is below a threshold value $V_{lamp\_peak}$ (pk), the switch Q2 is opened again after time $t_R$ in S107. However, the switch Q2 can also be opened again at a time $t<t_R$ in S107.

In S108, the switch-on duration $t_R$ is increased. Thus, the operating frequency of the inverter is also reduced. The operation is repeated by a return from S108 to S102. A delay time $t_D$ can be provided between S108 and S102.

During normal operation of the lamp, the impermissible state of the lamp being operated capacitively can occur. In this state, a current is already flowing through the switch when the lamp is switched on. As a result, the switch can be destroyed. Furthermore, the closed-loop control of the lamp by the ASIC during capacitive operation no longer functions.

FIG. 5a shows a flowchart relating to a method for avoiding capacitive operation of the lamp. In order to identify capacitive operation, in this case a gradient measurement between the phase of lamp voltage and half-bridge current is performed. (Instead of the lamp voltage it is also possible for another voltage in the load circuit to be monitored, for example the voltage across the inductor or across a transformer if a transformer is provided).

After successful starting, the lamp is in normal operation in step S201. At least two measurements are performed at successive points in time at the pin SDVlamp in S202. The measurements are sampled values (samples). The measurements are selected at a time just before the switch Q2 is opened.

In S203, the difference between the at least two measurements is calculated.

If the subsequent sampled value is lower than the preceding value, there is inductive operation of the lamp. This operation is permissible. An exemplary signal of inductive operation is provided in FIG. 8.

The system returns to S202 and the measurement operation is repeated. It is, however, also possible for a measurement to be performed again only after a time interval, or only after the change in parameters, for example lamp dimming.

If the subsequent sampled value is higher than the preceding value, there is capacitive operation of the lamp. This operation is impermissible. An exemplary signal of capacitive operation is provided in FIG. 9. However, it is also conceivable for impermissible capacitive operation to only be established when the subsequent sampled value has been higher than the preceding value a plurality of times, for example five times in succession.

Then, the switch Q2 is opened in S204.

After a dead time, the switch Q1 is closed again in S205. The dead time is preferably a predetermined value, but it is also conceivable to use an adaptive method for determining the dead time. It would thus be possible, for example, for the dead time to be extended in the event of a single or repeated occurrence of capacitive operation. The dead time can also be adapted by virtue of the fact that the half-bridge current is measured and tested prior to the switch Q2 being switched on (i.e. while a current is already flowing through the freewheeling diode from the switch Q2). In the event of an impermissible value for the half-bridge current, the dead time can be increased and thus the switch Q2 can be protected from an overcurrent or an overload.

Once the switch Q1 has been closed in S205, the system returns to S202 and the measurement operation is repeated.

A further method for avoiding capacitive operation of the lamp is shown in the flowchart in FIG. 5b. In order to identify capacitive operation, in this case the difference between absolute values is measured.

Instead of the differential measurement, however, absolute value detection is also conceivable. In this case, a comparison of the current value prior to the switch Q2 being switched off with a threshold value is performed.

After successful starting, the lamp is in normal operation in step S301. A measurement S1 is performed in S302 directly prior to the switch Q2 being switched off at the pin SDVlamp.

A further measurement S2 is performed in S303 immediately after switch Q1 has been switched on.

In S304, the threshold value is compared with the difference S1−S2.

Figure 10:
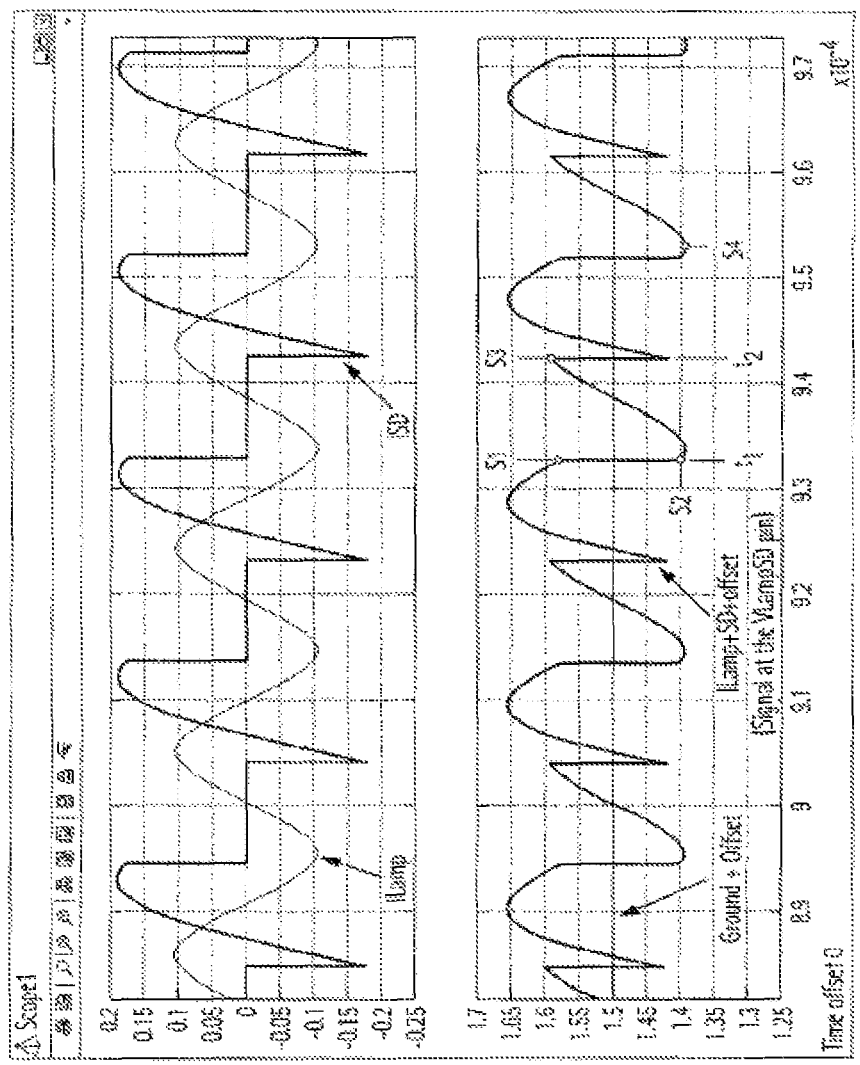
FIG. 10 shows a graph showing the identification of capacitive operation by means of absolute value measurement.

An example of this is given in FIG. 10. The current ISD is in this case that through the measuring resistor (shunt) R101, i.e. the voltage signal proportional thereto. The "offset" magnitude is produced in a targeted manner by an internal current source in the ASIC (illustrated in FIG. 1 and FIG. 2). The signal $I_{Lamp}$ is the signal which is present at the point "lamp voltage" in FIG. 2. Signals ISD and SD are the same, namely in each case the measured voltage at the half-bridge shunt (measuring resistor between the lower-potential switch and ground) R101.

If the difference S1–S2 is greater than the threshold value, there is inductive operation of the lamp. This operation is permissible. The system returns to S302 and the measurement operation is repeated. However, it is also possible for a measurement to be performed again only after a time interval, or only after the change in parameters, for example lamp dimming.

If the difference S1–S2 is less than the threshold value, there is capacitive operation of the lamp. This operation is impermissible. However, it is also conceivable for impermissible capacitive operation to only be established when the difference has been less than the threshold value a plurality of times, for example five times in succession.

The drive frequency of the half bridge is increased in S305. As a result, the lamp operation again enters the inductive branch of the resonance curve.

If impermissible capacitive operation is detected beyond a predetermined number of measurements, the lamp is disconnected.

For this purpose, a counter x is increased by one in S306.

The value of the counter x is compared with a reference value $X_{max}$ in S307.

If $x<X_{max}$, the operation is repeated by returning from S307 to S302.

If $x \geq X_{max}$, the lamp is disconnected in S308. In this case, the counter x can be reset to zero.

Instead of immediate disconnection, any other measure is also conceivable, for example a signal which acts as a warning for capacitive operation.

It should also be noted that the approaches to solutions in FIG. 4a and FIG. 4b are of course also interchangeable. This means that, in the case of a gradient measurement, an increase in frequency of the half bridge is also possible, and in the case of absolute value measurement, early opening of switch 2 is also possible. Other combinations of features from FIG. 4a and FIG. 4b are also conceivable.

After successful starting of the lamp, the charging into capacitor C101 slowly decreases. This charging was caused by a high half-bridge current during the starting phase. The internal DC current source and the DC voltage component of the lamp voltage recharge the capacitor C101 at the same time, however, owing to an EOL (End of Lamp Life) effect. In this way, the charging is stabilized to a certain level.

With the aid of a measurement prior to or during the switching-off of the switch Q1, the DC voltage component of the lamp voltage can be monitored in a simple manner.

An illustrative example of a measurement of the EOL effect is provided in FIG. 11, FIG. 12, FIG. 13 and FIG. 14. In this case, a measurement is performed prior to switch 2 closing and a measurement is performed after switch 2 has opened.

Figure 11:
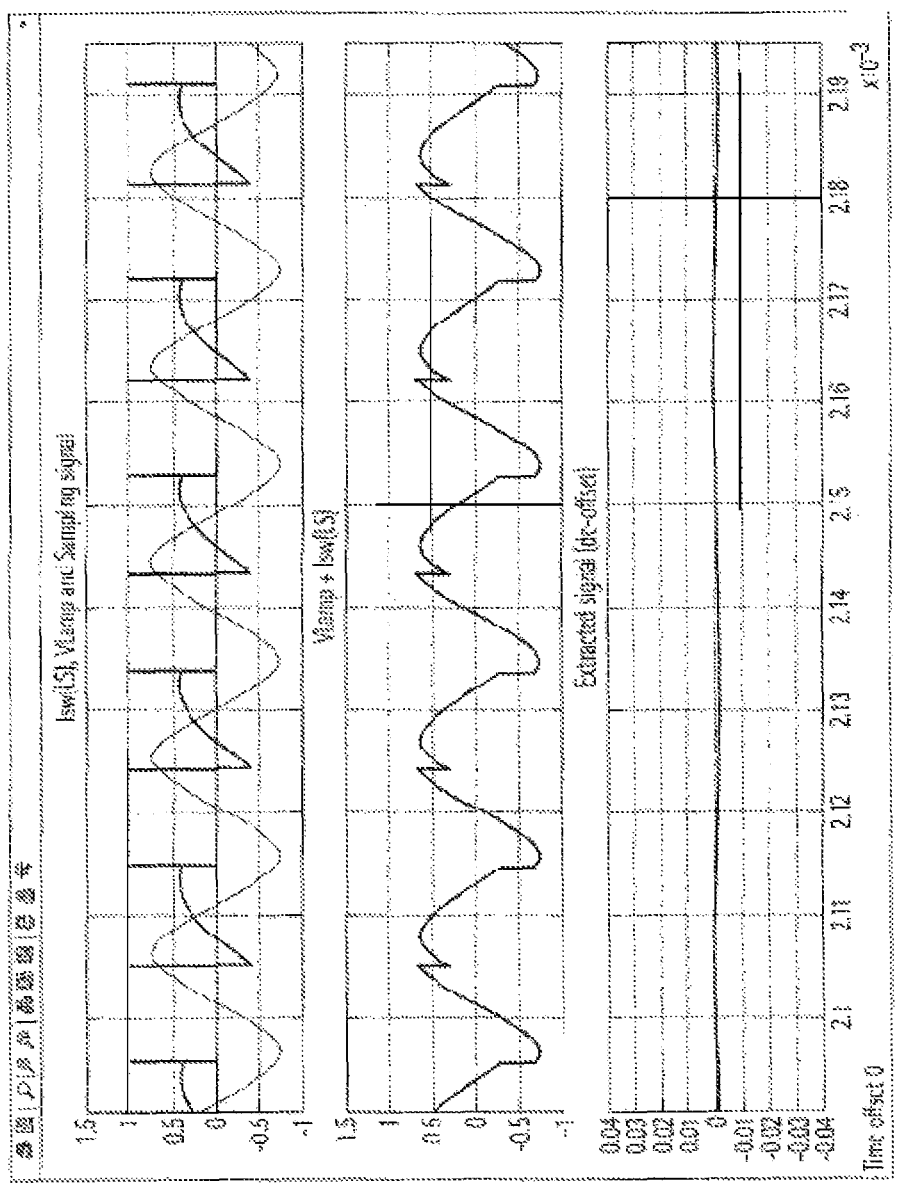
FIG. 11 shows a graph showing a measurement signal of a lamp without EOL (End Of Lamp Life).

In FIG. 11, there is no EOL effect. The calculated DC offset is zero.

Figure 12:
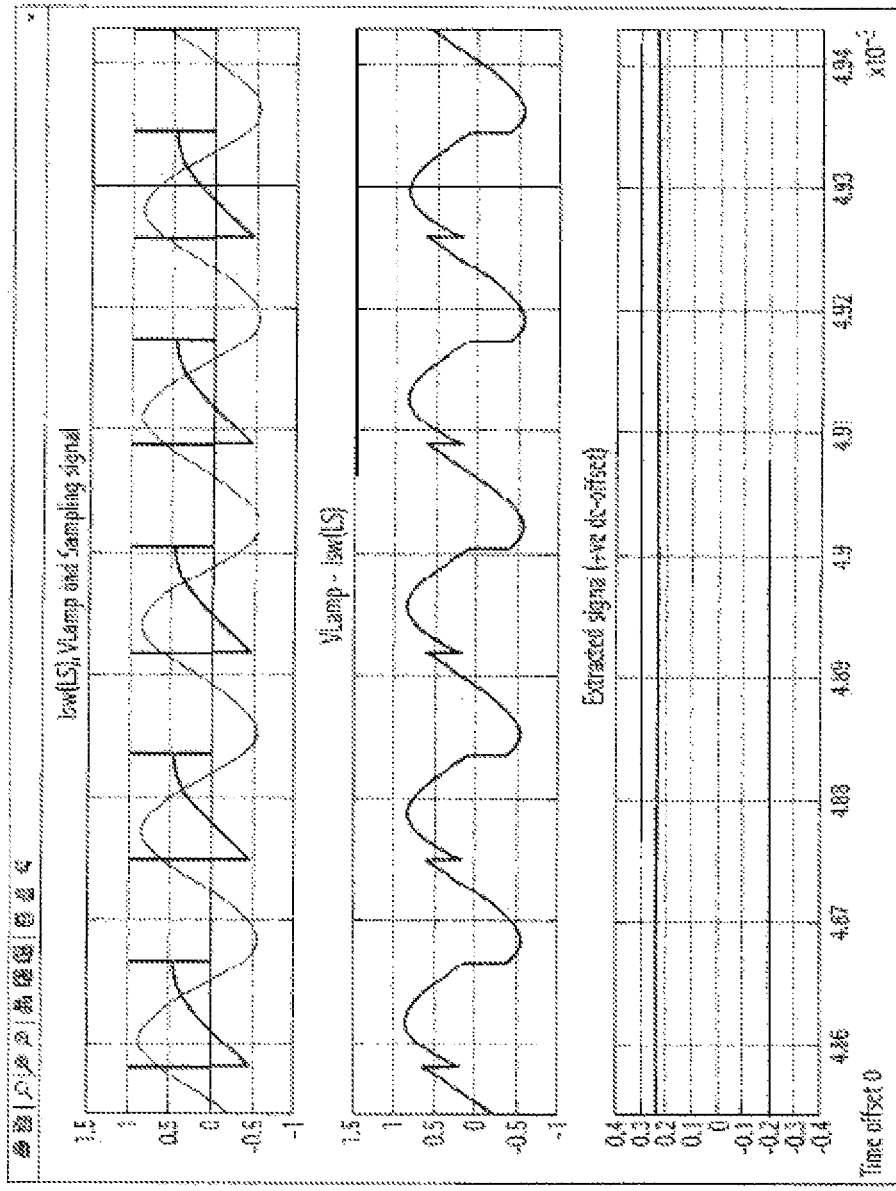
FIG. 12 shows a graph showing a measurement signal of a lamp with EOL (End Of Lamp Life) with a positive DC offset.

In FIG. 12, there is an EOL effect. The calculated DC offset is positive.

Figure 13:
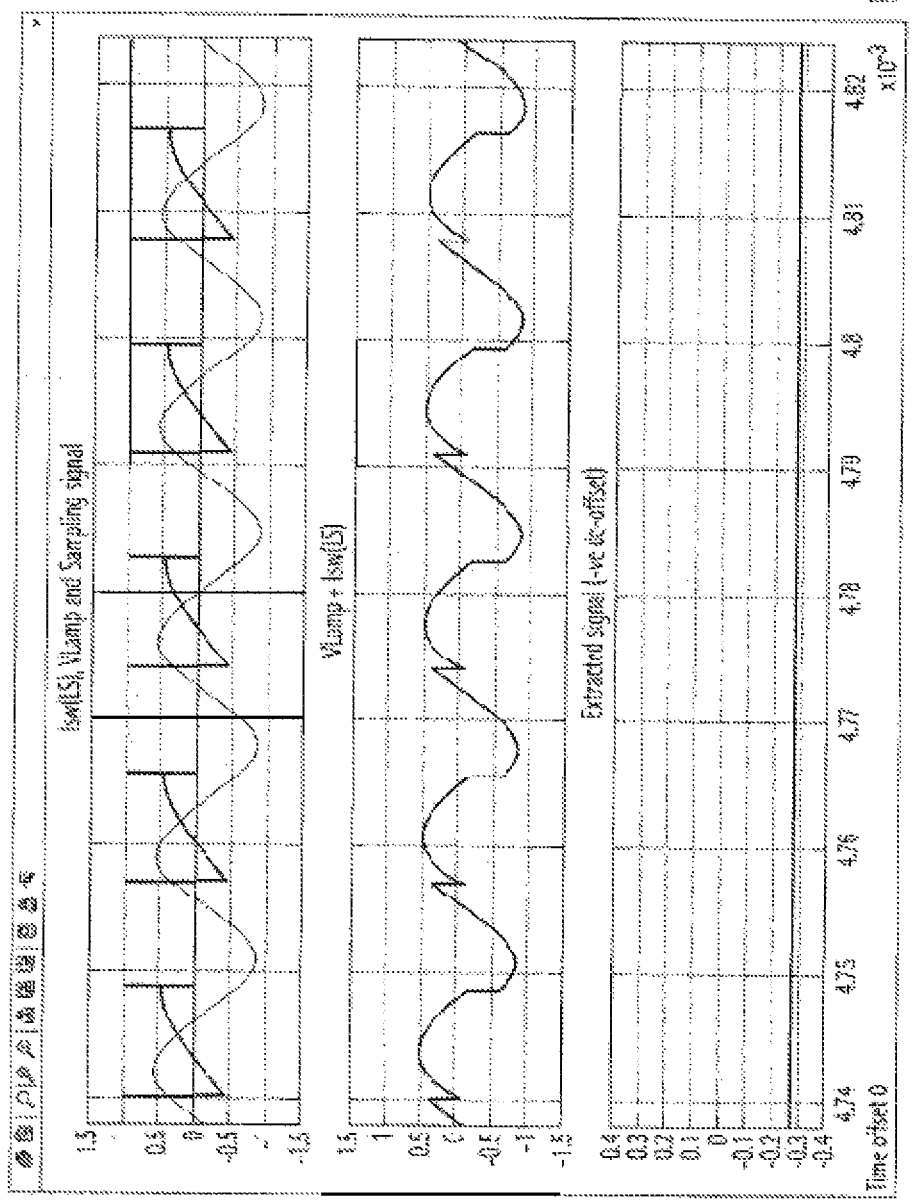
FIG. 13 shows a graph showing a measurement signal of a lamp with EOL (End Of Lamp Life) with a negative DC offset.

In FIG. 13, there is an EOL effect. The calculated DC offset is negative.

Figure 14:
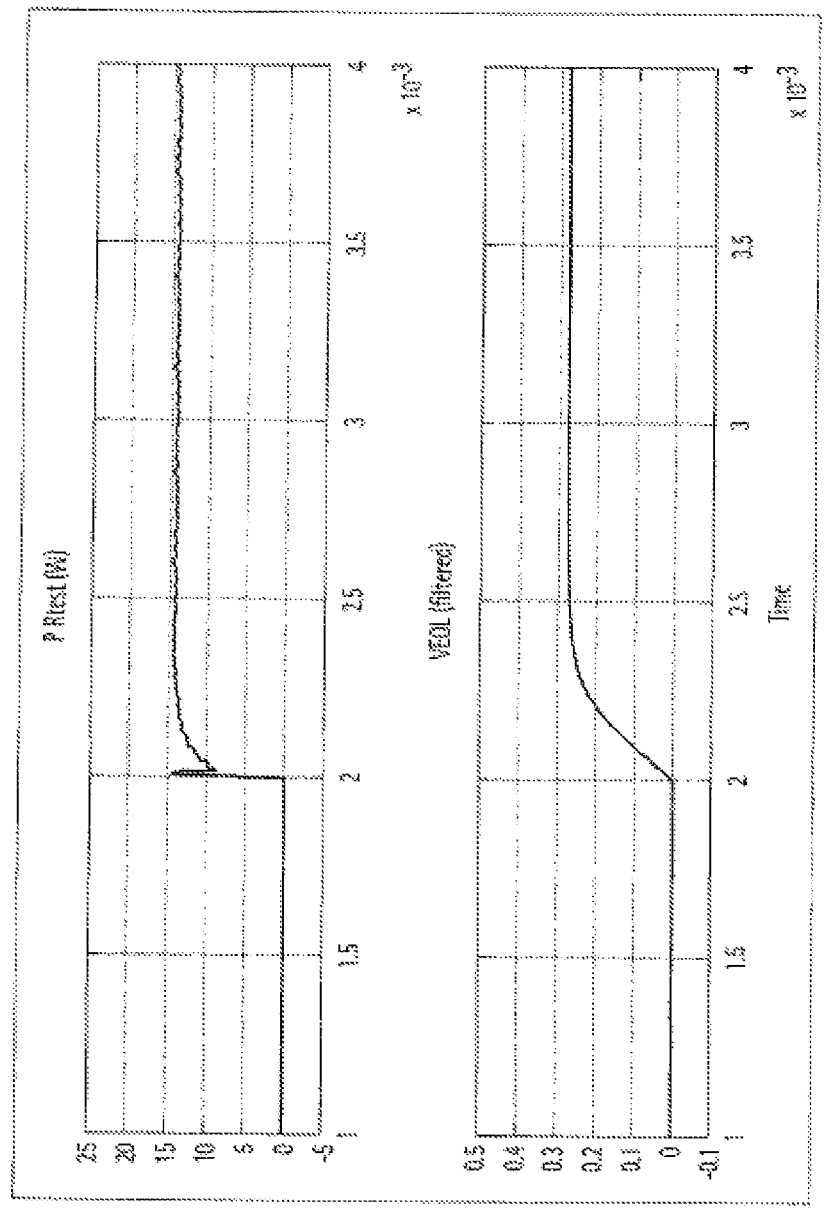
FIG. 14 shows a graph showing a calculated DC offset of a lamp with the EOL (End Of Lamp Life) effect occurring.

FIG. 14 shows an exemplary graph of a calculated DC offset, in which a positive EOL effect occurs at time t=2.

Figure 6:
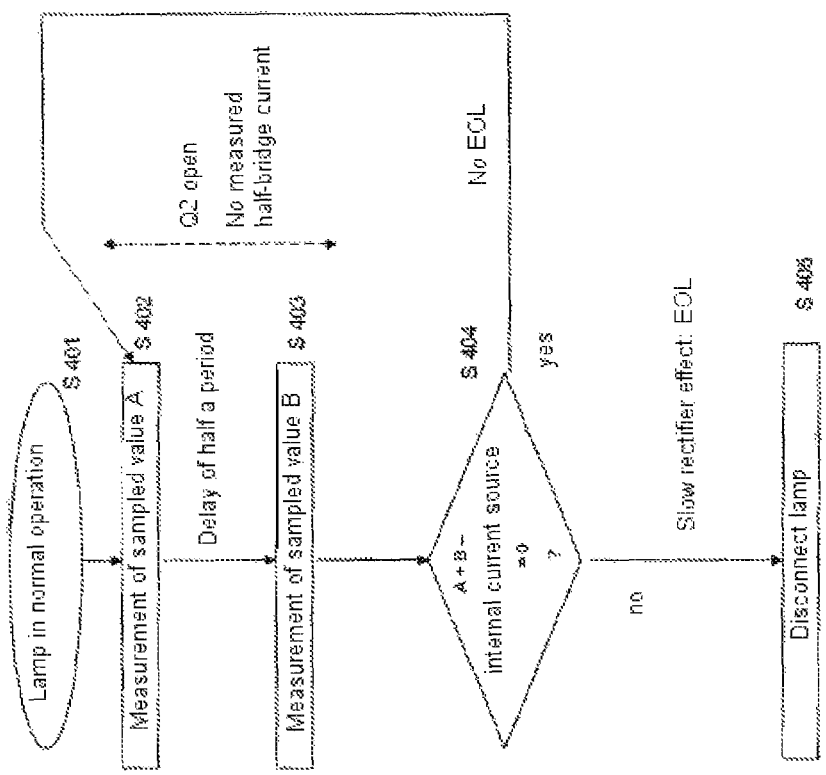
FIG. 6 shows a flowchart for explaining the method according to the invention for EOL (End Of Lamp Life) identification.

FIG. 6 shows a flowchart relating to a method for identifying an EOL (End Of Lamp Life). This state can be identified from a slow rectifier effect of the lamp occurring. The identification is preferably only activated after a certain time after lamp starting, for example after 200 µm. This ensures that the capacitor C101 has been charged completely by the internal current source.

After successful starting, the lamp is in normal operation in step S401.

In S402, a first sampled value A1 is taken at the pin SDVlamp.

In S403, a second sampled value A2 is taken at the pin SDVlamp.

Both measurements are selected at a time when the switch Q2 is open. There is therefore no half-bridge current flowing at both times. As a result, the single measured DC component comes from the lamp voltage. It is assumed here that the lamp current does not have DC components.

It is likewise necessary for the two measurements to be performed at an interval of half a period of the operating frequency of the half bridge. This means that the two sampling times have a phase shift of 180°. It is thus necessary for switch Q2 to be open for at least half a period.

If the signal does not have a DC component, the two measured values need to have the same magnitude, but a different mathematical sign, owing to the sinusoidal signal.

In S404, therefore, an addition of the two sampled values A1 and A2 is performed. Owing to the level shift by the internal current source of the ASIC, the result of the addition will in any case be in the positive range. In order to identify a DC effect of the lamp, the DC level of the internal current source of the ASIC therefore also needs to be subtracted from the addition of A1 and A2.

If it is not possible to establish a DC effect of the lamp, there is also no EOL (End of Lamp Life). The operation is repeated by returning from S404 to S402.

If a DC effect of the lamp is established, there is an EOL (End of Lamp Life). In this case, the lamp is disconnected in S405. However, it is also conceivable to establish an EOL only when a DC effect (rectifier effect) has been established a plurality of times, for example five times in succession.

Instead of immediate disconnection, any other measure is also conceivable, for example a signal which acts as a warning for an EOL (End of Lamp Life).

LIST OF REFERENCE SYMBOLS

1 Operating device
2 Inverter
3 Control circuit with internal DC source
4 Light-emitting element
5 Load
6 Storage capacitor
7 AC/DC converter
8 Filter
Q1 Higher-potential switch (HS=High Side)
Q2 Lower-potential switch (LS=Low Side)
R102 Measuring resistor in series with half bridge for measuring the half-bridge current
R104 Voltage divider resistor in parallel with light-emitting element for measuring lamp voltage
SDVLamp Pin of the ASIC, to which the measurement of the half-bridge current and the lamp voltage are supplied
SDVILamp Pin of the ASIC, to which the measurement of the half-bridge current, the lamp voltage and the lamp current are supplied
A Internal DC source of the ASIC
R101 Measuring resistor ("shunt")
C101 AC filter
R107 Measuring resistor in series with light-emitting element for measuring the lamp current C62 Coupling capacitor
L60 Inductor of series resonant circuit
C63 Capacitor of series resonant circuit
$I_{SW}$ Half-bridge current
ILamp Lamp current
VLamp Lamp voltage

The invention claimed is:

1. A method of operating a light-emitting element comprising:
   operating the light-emitting element starting from a half-bridge or full-bridge circuit,
   supplying to a first input of a control circuit a measurement signal which represents a current through the half-bridge or full-bridge circuit and/or a measurement signal which represents a current drawn by the light-emitting element, and
   supplying to the first input of the control circuit a measurement signal which represents a voltage across the light-emitting element.

2. The method as claimed in claim 1, further comprising:
   evaluating, by the control circuit, the supplied measurement signals for fault identification and/or for operation of the light-emitting element, and
   adjusting a parameter representing a power of the light-emitting element.

3. The method as claimed in claim 2, further comprising, by the control circuit and responsive to detecting a fault state, outputting a fault signal, changing a mode of operation of the light-emitting element, or disconnecting the light-emitting element.

4. The method as claimed in claim 3, wherein the fault state comprises a light-emitting element voltage which is above a predetermined threshold value.

5. The method as claimed in claim 4, further comprising, by the control circuit and responsive to detection of an impermissibly high light-emitting element voltage, opening a lower-potential switch of a half bridge prematurely and/or increasing a frequency of alternate clocking of two switches of the half bridge.

6. The method as claimed in claim 3, wherein the fault state comprises a half-bridge current or a light-emitting element current which is above a predetermined threshold value.

7. An application-specific integrated circuit (ASIC) control circuit configured to implement the method as claimed in claim 2.

8. An operating device for a gas discharge lamp, LED, or OLED light-emitting element having the ASIC control circuit as claimed in claim 7.

9. A lighting system comprising a control unit and the operating device as claimed in claim 8.

10. A circuit for operating a light-emitting element, the circuit comprising:
    a half-bridge or full-bridge circuit for providing a supply voltage for the light-emitting element, and
    a control circuit for closed-loop control of operation of the light-emitting element and/or fault identification,
    the control circuit including a first input to which are supplied at least two of:
      a measurement signal which represents a current through the half-bridge or full-bridge circuit,
      a measurement signal which represents a current drawn by the light-emitting element, and
      a measurement signal which represents a voltage across the light-emitting element.

11. The circuit as claimed in claim 10, wherein the control circuit is designed to evaluate the supplied measurement signal(s) for fault identification and/or for operation of the light-emitting element, and to adjust a parameter representing a power of the light-emitting element.

12. The circuit as claimed in claim 10, further comprising a resistive divider which detects the voltage across the light-emitting element.

13. The circuit as claimed in claim 10, further comprising a measuring resistor in series with a lower-potential switch of the half bridge to detect the half-bridge current.

14. The circuit as claimed in claim 10, wherein the light-emitting element comprises one or more gas discharge lamps, LEDs, and/or OLEDs.

15. The circuit as claimed in claim 10, wherein the circuit comprises an application-specific integrated circuit (ASIC) circuit.

16. A method of operating at least one light-emitting element, the method comprising:
    operating the light-emitting element starting from an inverter circuit,
    supplying to a first input of a control circuit a measurement signal which represents a current through the inverter circuit and/or a measurement signal which represents a current drawn by the light-emitting element, and
    supplying to the first input of the control circuit a measurement signal which represents a voltage across the light-emitting element.

17. A method of operating at least one light-emitting element, the method comprising:
    operating the light-emitting element starting from a half-bridge or full-bridge circuit,
    supplying to a first input of a control circuit at least two of:
    a measurement signal which represents a current through the half-bridge or full-bridge circuit, and
    a measurement signal which represents a current drawn by the light-emitting element,
    a measurement signal which represents a voltage across the light-emitting element.

18. A method of operating at least one light-emitting element, the method comprising:
    operating the light-emitting element starting from an inverter circuit,
    supplying to a first input of a control circuit at least two of:
    a measurement signal which represents a current through the inverter circuit,
    a measurement signal which represents a current drawn by the light-emitting element, and
    a measurement signal which represents a voltage across the light-emitting element.

19. A method of operating a light-emitting element comprising:
    operating the light-emitting element starting from a half-bridge or full-bridge circuit,
    supplying to an input of a control circuit a measurement signal which represents a current through the half-bridge or full-bridge circuit and/or a measurement signal which represents a current drawn by the light-emitting element,
    supplying to the input of the control circuit a measurement signal which represents a voltage across the light-emitting element;
    evaluating, by the control circuit, the supplied measurement signals for fault identification and/or for operation of the light-emitting element;
    adjusting a parameter representing a power of the light-emitting element; and
    by the control circuit and responsive to detecting a fault state, outputting a fault signal, changing a mode of operation of the light-emitting element, or disconnecting the light-emitting element, wherein the fault state comprises a half-bridge current which rises at a time at which a lower-potential switch of the half bridge is switched off or is in an impermissible range.

20. The method as claimed in claim 19, further comprising, in response to the identified fault state, increasing the drive frequency of alternate clocking of switches of the half bridge until capacitive operation is no longer identified.

21. A method of operating a light-emitting element comprising:
- operating the light-emitting element starting from a half-bridge or full-bridge circuit,
- supplying to an input of a control circuit a measurement signal which represents a current through the half-bridge or full-bridge circuit and/or a measurement signal which represents a current drawn by the light-emitting element, and
- supplying to the input of the control circuit a measurement signal which represents a voltage across the light-emitting element;
- evaluating, by the control circuit, the supplied measurement signals for fault identification and/or for operation of the light-emitting element;
- adjusting a parameter representing a power of the light-emitting element; and
- detecting a fault state when addition of two measured values for the light-emitting element voltage which are taken at two successive zero crossings of the half-bridge current produces a value in an impermissible range.

\* \* \* \* \*